UNITED STATES PATENT OFFICE.

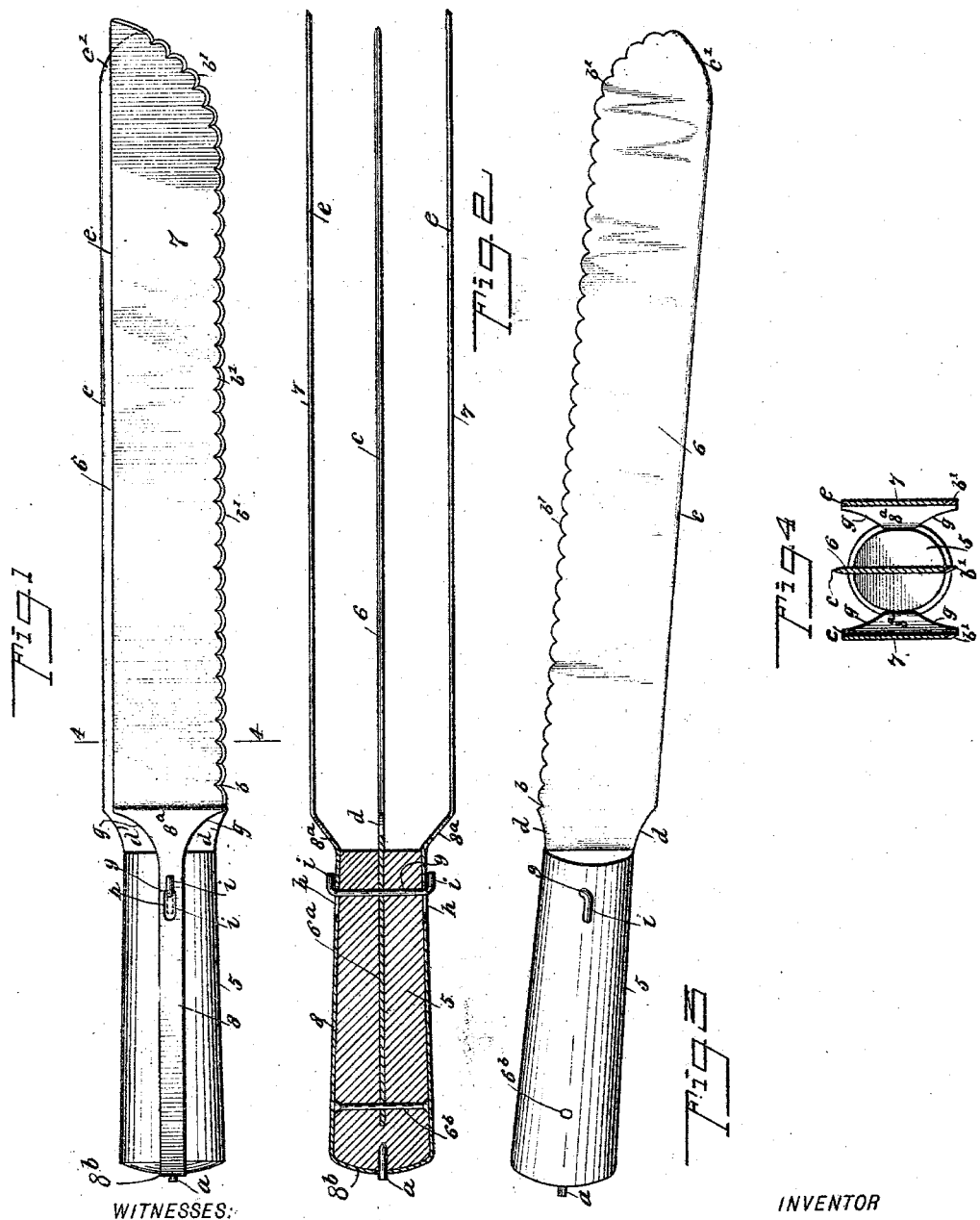

WILLIAM KELLEY, OF SCAMMON, KANSAS.

SLICING-KNIFE.

SPECIFICATION forming part of Letters Patent No. 726,697, dated April 28, 1903.

Application filed May 27, 1902. Serial No. 109,170. (No model.)

*To all whom it may concern:*

Be it known that I, WILLIAM KELLEY, a citizen of the United States, and a resident of Scammon, in the county of Cherokee and State of Kansas, have invented a new and Improved Slicing-Knife, of which the following is a full, clear, and exact description.

This invention relates to a class of knives provided with a plurality of blades held in parallel planes on a single handle for cutting slices of bread or other material expeditiously, and has for its object to provide a knife of the class indicated having novel features of construction that adapt it to cut a plurality of slices of bread or other material at one time and also by easy detachment of the two outer blades from the handle enable the use of a central blade for cutting soft material, such as bread or cake, with one edge of this blade and meat or other substance of a more compact nature with the opposite edge.

The invention consists in the novel construction and combination of parts, as is hereinafter described, and indicated in the appended claims.

Reference is to be had to the accompanying drawings, forming a part of this specification, in which similar characters of reference indicate corresponding parts in all the figures.

Figure 1 is a side view of the improved slicing-knife complete. Fig. 2 is a plan view of the device, the handle being in section. Fig. 3 is a side view of the knife having two side blades removed so as to permit the use of the central blade for cutting meat or other compact material, and Fig. 4 is a transverse sectional view substantially on the line 4 4 in Fig. 1.

The knife-handle 5 may be formed of hard wood or other suitable material having a preferably rounded body of sufficient length for effective service. Through the longitudinal center of the handle 5 a slit is cut of suitable length, extending from the tip end toward the butt-end of the same, leaving a portion of the butt-end intact, as is shown in Fig. 2.

A cutting-blade 6 is provided, one end portion of which is fitted into the slit in the handle 5 and seated at its inserted end against the bottom of the slit, a rivet $6^b$ being secured transversely in the handle and passing tightly through the haft $6^a$ of the blade 6 near its inner end, as is shown in Fig. 2.

Preferably the handle 5 is tapered somewhat from the butt-end to the opposite end thereof, and centrally in the butt-end of the handle a keeper-pin $a$ is firmly inserted, leaving an end thereof projecting slightly, as shown in Figs. 1, 2, 3. The blade proper, which projects from the portion $6^a$, is flat, may with advantage be increased in width as compared with the haft or flat shank that is secured in the handle 5, and is rendered substantially parallel on the edges $b$ $c$.

At $d$, where the haft $6^a$ and blade 6 merge together, it is preferred to form opposite scallops, which afford a neat finish by removal of objectional corners. The edge $b$ is preferably formed with convexed teeth $b'$, which extend the entire extent of said edge and also around the ovate free end of the blade to a point that defines about one-half the breadth of the blade, as indicated in Figs. 1 and 3.

The opposite edge $c$ of the blade 6 is beveled from each side to render it sharp, this plain cutting edge being continued at the curvature $c'$, where this portion of the beveled cutting edge merges into the toothed edge, as is clearly shown in Fig. 3.

The pair of similar blades 7, that coact with the blades 6 to cut three slices of bread or cake at a time, have each a toothed edge $b'$, similar with the convex teeth on one edge of the central blade 6, and at their free ends curve convexly until said toothed edge joins the outer end of the back edge $e$ on each blade 7. The blades 7 may each have less width from the cutting edge to the back edge than that of the blade 6, and at their heels are joined integrally with the looped bridle 8.

The bridle 8 is of reduced width as compared with the twin blades 7, and consists of a strip of material joined to the heels of these blades by outwardly-bent guard portions $8^a$, concaved on their edges, as shown at $g$ in Figs. 1 and 4. The bridle 8 is bent at its looped end $8^b$, so as to conform with the contour of the butt-end of the handle 5, and is perforated at the transverse center of said looped end to engage with the keeper-pin $a$, that is passed through the perforation when the twin blades 7 are placed in position for service on the handle 5.

The similar side members of the bridle 8 are made to closely fit against the opposite sides of the handle 5 when placed thereon, and at a suitable point near the forward end of the handle 5 opposite slots $h$ are formed transversely through these side members of the bridle, as indicated in Figs. 1 and 2.

A locking-bar 9 is provided as a convenient means for detachably holding the knife-blades 7 in place on the handle 5, and, as clearly shown in Fig. 2, this locking-bar consists of a wire rod bent at each end to provide short fingers $i$, which project at a right angle from the body of the bar in the same direction and parallel with each other.

The handle 5 and shank or haft $6^a$ of the blade 6 are transversely perforated in alinement for the reception of the body of the locking-bar 9, which is neatly fitted therein before the fingers $i$ are bent on the ends of said bar.

The locking-bar 9 is so relatively positioned in the handle 5 that when the fingers $i$ are turned toward the butt-end of the handle the slots $h$ will freely permit the passage of the fingers therethrough when the looped bridle 8 is mounted upon the handle 5, the resilience of the slotted side members of the bridle permitting them to be sprung apart sufficiently to effect such an engagement of the fingers within the slots $h$, as indicated for one finger by dotted lines in Fig. 1.

When the coacting blades 7 are to be secured upon the handle 5, it is only necessary to mount the looped bridle 8 upon the handle by passing the pin $a$ through the perforation made to receive it in the looped end of the bridle. The side members of the bridle are now arranged upon the handle 5, so that the fingers $i$ pass through the slots $h$. Said fingers are now turned forwardly, and thus are caused to bear as cams upon the surface of the bridle forward of the slots $h$, which will obviously lock the blades 7 in a stable manner upon the handle 5. When the blades 7 are in position, their toothed edges will be disposed nearly in the same plane with that of the toothed edge on the central blade 6, and the blades 7 will be evenly spaced from said blade 6 and parallel therewith.

It will be seen that the provision of the two attachable blades 7 enables the operator to cut three slices of bread or cake of equal thickness at the same time, thus expediting the operation of cutting a supply of bread for use.

In case the knife is to be used to carve meat, slice ham, or cut any other material of more compactness than bread the single central blade 6 will become quickly available for such purpose by simply turning the fingers $i$ so that they will extend toward the butt-end of the handle 5, and thus dispose them over the slots $h$, whereupon the blades 7 may be sprung apart sufficiently to release the bridle from the handle, and thus detach the blades 7 therefrom, the beveled edge $c$ of the blade serving to cut the meat as may be desired.

Having fully described my invention, I claim as new and desire to secure by Letters Patent—

1. A slicing-knife, comprising a handle slotted endwise to receive a blade, a blade insertible in said slot, a rivet and a locking-bar adapted to secure said blade in the handle, two coacting blades held spaced apart and parallel by an integral looped bridle, means for holding the looped end of the bridle engaged with the butt-end of the handle, and fingers on the locking-bar that pass through slots in the bridle and by adjustment clamp said bridle on the handle.

2. A slicing-knife, comprising a handle, a blade secured in the handle, two twin blades joined together at one end by an integral looped bridle, the side members of the bridle forming guards between the blades and the handle, and means for detachably securing the twin blades and their connecting-bridle upon the handle.

3. A slicing-knife, comprising a rounded handle slotted to receive a blade, a blade having convex-edged teeth formed on one edge and a plain cutting edge oppositely on the knife-blade from the toothed edge, two twin blades, an integral looped bridle connecting the twin blades at one end thereof, a pin in the butt-end of the handle, adapted to pass through a perforation in the looped end of the bridle, the said members of the bridle having opposite slots formed therein, and a transverse locking-bar having fingers on its end adapted to pass through the slots and by turning adjustment lock the bridle on the handle.

In testimony whereof I have signed my name to this specification in the presence of two subscribing witnesses.

WILLIAM KELLEY.

Witnesses:
JAMES E. BURKE,
JNO. C. ARNOLD.